(12) United States Patent
Kernan

(10) Patent No.: US 8,661,345 B2
(45) Date of Patent: Feb. 25, 2014

(54) SOCIAL NETWORKING WEBPAGE APPLICATION

(76) Inventor: Michael Stephen Kernan, Beverly Hills, CA (US)

( * ) Notice: Subject to any disclaimer, the term of this patent is extended or adjusted under 35 U.S.C. 154(b) by 65 days.

(21) Appl. No.: 13/083,482

(22) Filed: Apr. 8, 2011

(65) Prior Publication Data

US 2011/0252325 A1  Oct. 13, 2011

Related U.S. Application Data

(60) Provisional application No. 61/322,759, filed on Apr. 9, 2010.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |

(52) U.S. Cl.
USPC ............................. 715/733; 719/328; 715/963

(58) Field of Classification Search
USPC .................................. 715/733, 963; 719/328
See application file for complete search history.

(56) References Cited

U.S. PATENT DOCUMENTS

| | | | | |
|---|---|---|---|---|
| 7,680,882 | B2* | 3/2010 | Tiu et al. ....................... | 709/203 |
| 8,131,778 | B2* | 3/2012 | Golds et al. ................... | 707/804 |
| 8,161,419 | B2* | 4/2012 | Palahnuk et al. .............. | 715/781 |
| 8,180,829 | B2* | 5/2012 | Arav .............................. | 709/204 |
| 8,209,380 | B2* | 6/2012 | Tiu et al. ....................... | 709/203 |
| 8,214,457 | B2* | 7/2012 | Tiu et al. ....................... | 709/217 |
| 8,271,583 | B2* | 9/2012 | Stolorz et al. ................. | 709/203 |
| 8,527,345 | B2* | 9/2013 | Rothschild et al. ........ | 705/14.53 |
| 2010/0030578 | A1* | 2/2010 | Siddique et al. .................. | 705/3 |
| 2010/0088187 | A1* | 4/2010 | Courtney et al. .......... | 705/14.73 |
| 2012/0054037 | A1* | 3/2012 | Grossman .................. | 705/14.64 |
| 2012/0254903 | A1* | 10/2012 | Brown et al. ................. | 719/328 |

\* cited by examiner

*Primary Examiner* — David Phantana Angkool
(74) *Attorney, Agent, or Firm* — Antonio Papageorgiou; Ostrow Kaufman LLP

(57) ABSTRACT

A Facebook™ application comprises logging on to Facebook™; looking in the Newsfeed for the "7 Days Out Application"; and clicking on the application for full listing of friends' plans, as well as events (sponsored by advertisers) over the next seven days. The application also comprises logging on to Facebook™; navigating to the "Home" page; clicking on the tab or icon for "7 Days Out—Share Your Plans for Next 7 Days With Friends"; uploading a statement of plans for each particular day that the user wants to let friends know plans; and saving the inputted information.

12 Claims, 5 Drawing Sheets

SOCIAL NETWORKING WEBPAGE APPLICATION

CROSS-REFERENCE TO RELATED APPLICATIONS

This application claims the benefit of U.S. provisional application No. 61/322,759, filed Apr. 9, 2010, which is incorporated herein by reference.

BACKGROUND OF THE INVENTION

The present invention generally relates to software and, more specifically, to a Facebook™ application to apprise friends of one's schedule.

There is no easy way to let one's friends know one's plans for the weekend, or the upcoming week. There is no easy way on Facebook™ to see what one's friends are doing over the weekend or upcoming week, and is there is no easy way for advertisers to reach an audience on Facebook™ trying to make plans.

As can be seen, there is a need for an application to connect friends on Facebook™, and allow advertisers to advertise on Facebook™.

SUMMARY OF THE INVENTION

One aspect of the present invention is a computer-readable medium having computer executable instructions for finding out what a user's friends' plans are for the weekend, or the upcoming week, the computer-executable instructions performing steps comprising logging on to Facebook; looking in the Newsfeed for the "7 Days Out Application"; and clicking on the application for full listing of friends' plans, as well as events sponsored by advertisers over the next seven days.

Another aspect of the present invention is a computer-readable medium having computer executable instructions for letting a user's friends know what the user's plans are for the weekend, or the upcoming week, the computer-executable instructions performing steps comprising logging on to Facebook; navigating to the "Home" page; clicking on the tab or icon for "7 Days Out—Share Your Plans for Next 7 Days With Friends"; uploading a statement of plans for each particular day that the user wants to let friends know plans; and saving the inputted information.

These and other features, aspects and advantages of the present invention will become better understood with reference to the following drawings, description and claims.

DETAILED DESCRIPTION OF THE INVENTION

Figure 1:
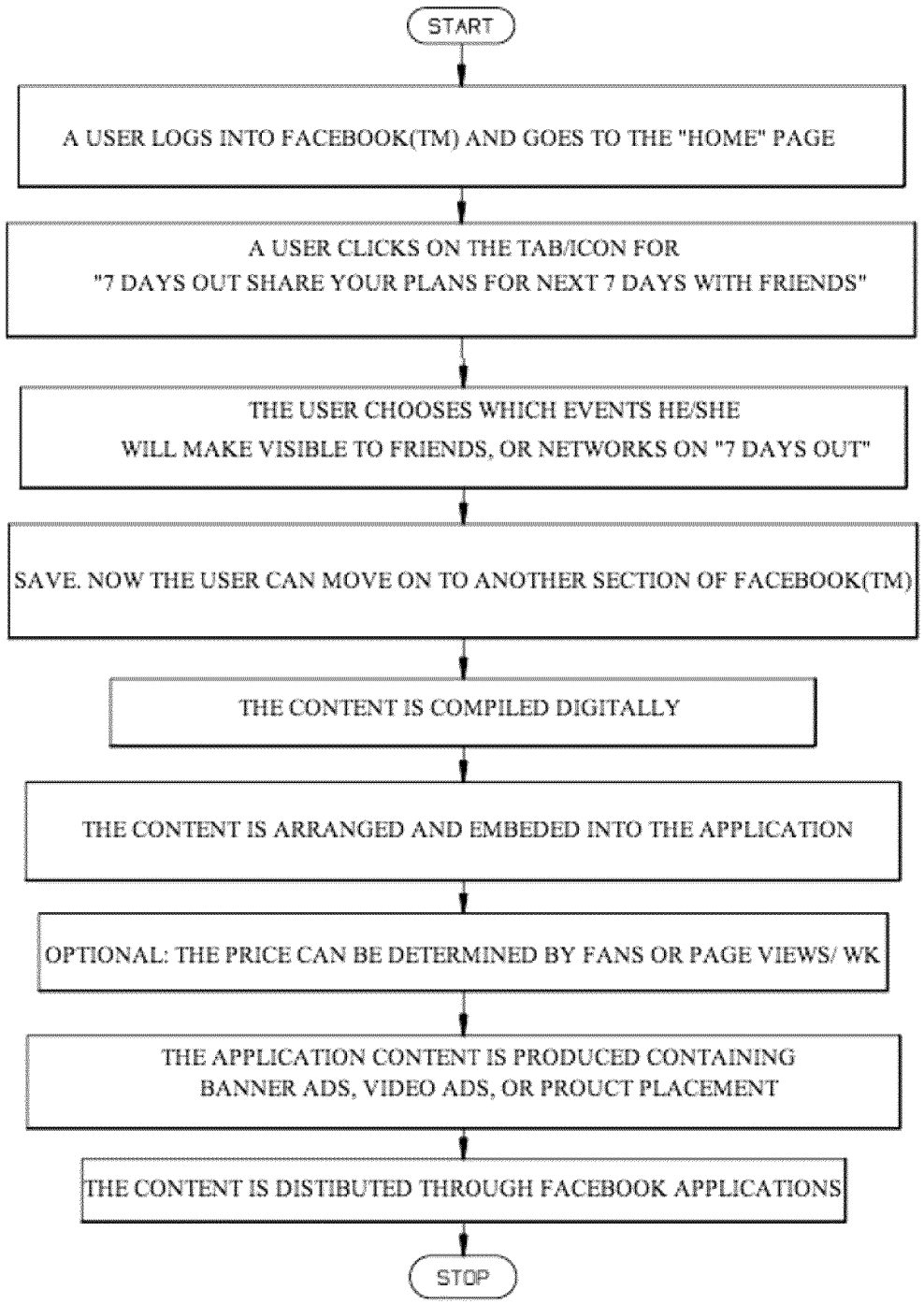
FIG. 1 is a flowchart of an exemplary embodiment of the process for a user to upload his or her plans to the "7 Days Out" application.
Figure 2:
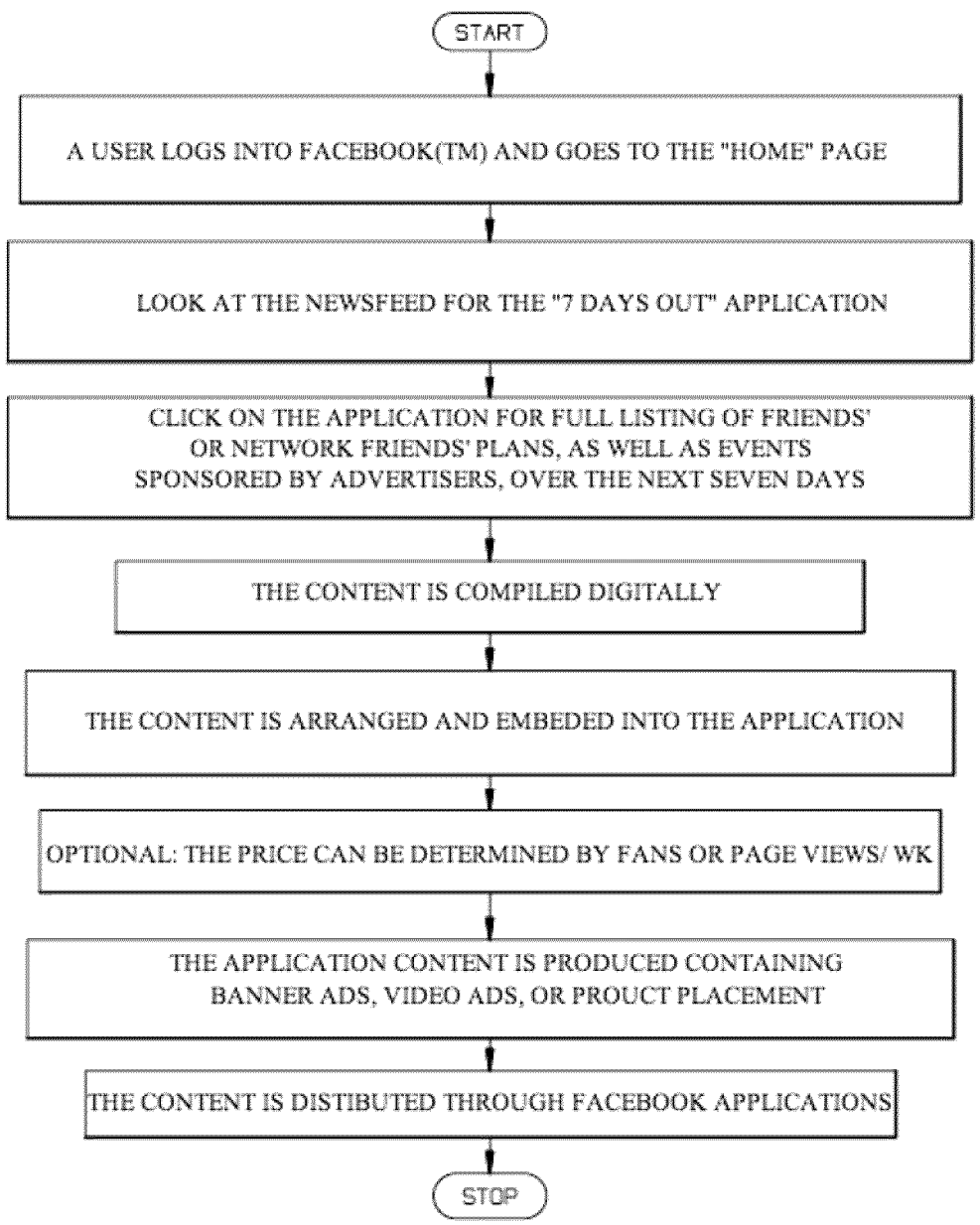
FIG. 2 is a flowchart of an exemplary embodiment of the process for a user to review the plans of friends or paid events on the "7 Days Out" application.
Figure 3:
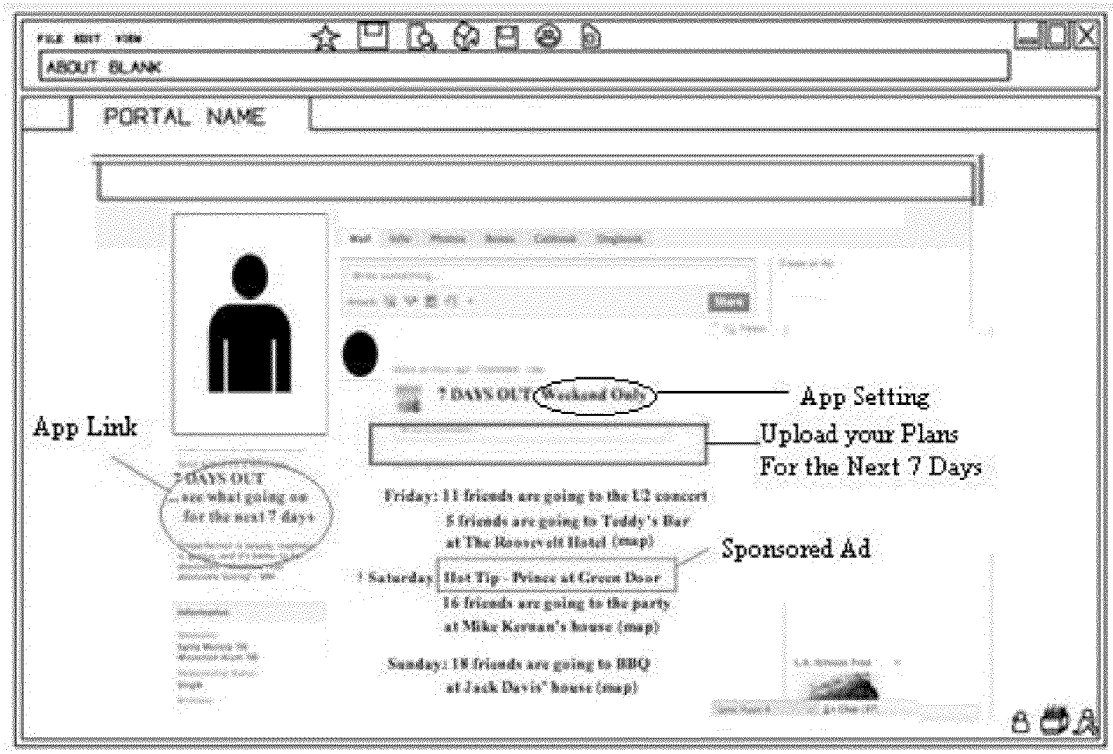
FIG. 3 depicts a screenshot showing the link on which to click and the "7 Days Out" application as it can appear in the newsfeed according to an exemplary embodiment of the invention.
Figure 4:
FIG. 4 depicts a screenshot showing the link to "upload your plans" link for a user to upload his/her plans to the "7 Days Out" application according to an exemplary embodiment of the invention.
Figure 5:
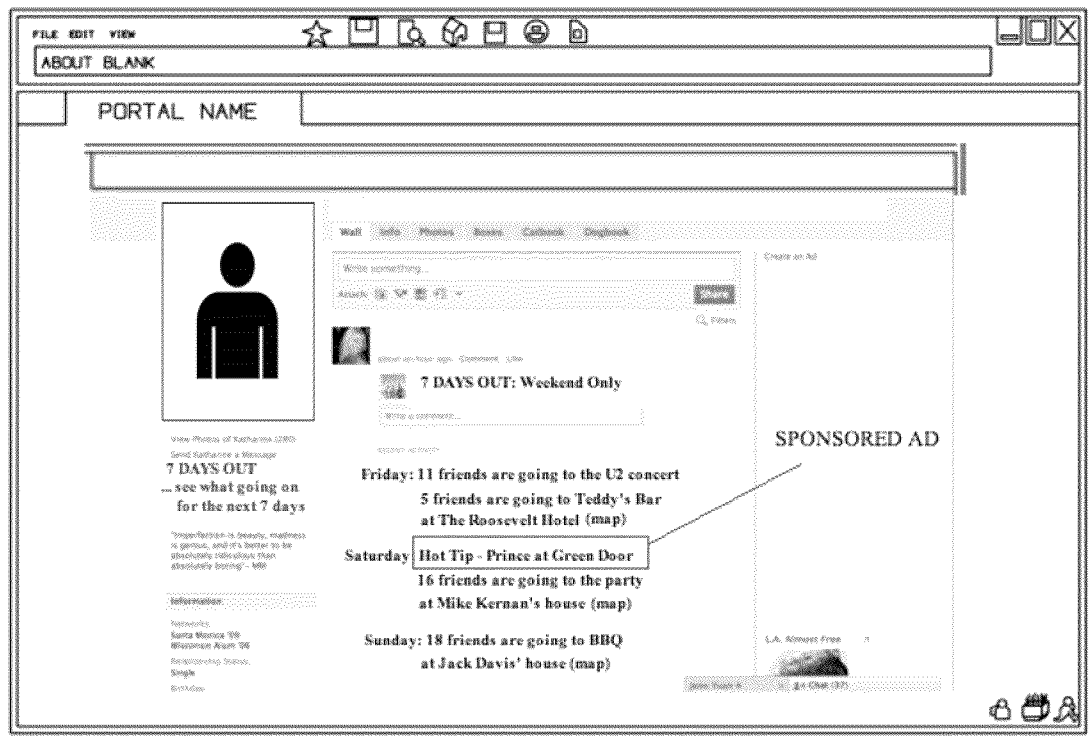
FIG. 5 depicts a screenshot showing the process for an advertiser to do a sponsored link in the "7 Days Out" application according to an exemplary embodiment of the invention.
Figure 6:
FIG. 6 depicts a screenshot showing the setting that can be used to determine where friends are "right now", for the upcoming

The following detailed description is of the best currently contemplated modes of carrying out exemplary embodiments of the invention. The description is not to be taken in a limiting sense, but is made merely for the purpose of illustrating the general principles of the invention, because the scope of the invention is best defined by the appended claims.

Broadly, an embodiment of the present invention generally provides an application to connect friends on Facebook™, and allow advertisers to advertise on Facebook™. Friends can immediately see what their friends are doing both that current evening and over the next seven days. Users can let their friends know of their plans for the next seven days.

There is no system on Facebook to plan your week or weekend. And, there is no system on Facebook that allows advertisers to reach potential customers seeking to make plans, such as concerts, theater or sporting events.

Facebook Events, the relevant related art, gives only certain events and does not facilitate planning a week or weekend. Additionally, it does not allow an advertiser interface, and does not provide an advertiser a way to connect with customers.

Whether you are single and dating—trying to make plans for the week, or you are a mom trying to plan park visits with other moms this week, "7 Days Out" allows you to make plans quickly and easily. This App's strength is the fact that it goes to the heart of Facebook's core, because it is a mathematical rendition of how we live our lives. We all make plans. On a Thursday, for example, a user may be making 20 calls to make plans for the weekend. Those 20 calls are a stroke of the computer key with this application.

Events from Facebook events, just like upcoming concerts, may be incorporated into "7 Days Out", but neither of these solves the problem solved here. For Facebook individual users, they can coordinate where they want to go and what to do in a fast, easy way, that saves time by avoiding numerous phone calls to do so. It creates a social system for Facebook, and for advertisers it creates a method to reach customers with upcoming events. The value proposition for users is that they do not need to make traditional plans. With a stroke of the key, they can make plans that traditionally could take 10 to 20 phone calls. For advertisers it allows them to reach relevant customers who are interested in upcoming events. This app allows targeted advertising; so, for example, Los Angeles users who have an interest in baseball will receive notifications of upcoming Dodger games. Additionally, this application follows the social graph, because it harnesses the information from a user's friends and helps them connect in making plans. Thus, they can connect in new ways and more easily. Not only can users keep track of their upcoming plans, they can get recommendations by friends on upcoming events.

Additionally, this application can allow one to see where one's friends are currently located or where they are going over the next week. The application can facilitate ease in making plans for one's social life.

An exemplary algorithm can sort the information by friends and also allow ranking (for example by popularity) of events for placement of the events on the "7 Days Out" landing page on Facebook™, which can allow a user to have a complete summary of events in their town.

An additional exemplary algorithm can organize events into different categories. The algorithm can allow the delivery of the events to be particular to the user's interests.

Yet another exemplary algorithm can allow delivery to a user based upon only what their friends on Facebook™ (rather than Facebook™ users generally) are doing over a particular period, for example a weekend. For example, rather than a user making 20 telephone calls or sending 20 emails to find out what their friends are doing that weekend, this algorithm can sort the input of each of a user's friends, and it can sort and deliver that information to the user in a useful, easy-to-use way.

Users can upload their plans for the next seven days. Advertisers can advertise regarding events occurring over the next seven days. This information can appear in a "7 Days Out" application in the newsfeed portion of Facebook™.

Facebook™ can be a mathematical rendition of how users live their lives (each may have friends, and their friends meet other friends through the user), and the instant application can follow the Facebook™ method. For example, the weekend embodiment of the instant application can be a mathematical rendition of how people act on a Friday afternoon. Instead of calling around to each of a user's friends to find out what they are doing that night or over that weekend, the user can simply click on the "7 Days Out" application and find out what their friends are doing over the weekend or the next seven days.

An exemplary embodiment of the instant application can connect friends on Facebook™ in real time, to allow them to easily make social plans for the weekend, and to allow advertisers to target users who are making such plans in order to, for example, sell tickets to a concert.

An embodiment can allow a user to determine where a user's friends are, where a user's friends are going on a specific night, the weekend or over the next seven days, and the best place to go on a specific night based upon where a user has more friends.

An exemplary embodiment of the instant application may comprise:

Letting Friends Know Your Plans

STEP 1: A user logs into Facebook™ and goes to the "Home" page.
STEP 2: A user clicks on the tab or icon for "7 Days Out—Share Your Plans for Next 7 Days With Friends"
STEP 3: The user uploads a statement of plans for each particular day that he/she wants to let friends know plans.
STEP 4: Save. Now the user can move on to another section of Facebook™

To View Friends' Plans

STEP 1: Logon to Facebook™
STEP 2: Look in the Newsfeed for the "7 Days Out Application"
STEP 3: Click on the application for full listing of friends plans, as well as events (sponsored by advertisers) over the next seven days.

An example of text that may be included in a statement of plans comprises:
"7 Days Out" Weekend Only
Friday: 11 friends are going to the U2 concert; 5 friends are going to Teddy's Bar at The Roosevelt Hotel
Saturday: Hot tip: Prince at Green Door; 16 friends are going to the party at John Doe's house
Sunday: 18 friends are going to BBQ at John Smith's house
There can be optional limitations that can be applied to the search, such as limitations to a specific geographic area. There can be options to search other cities. From the viewing perspective there can be categories that can be selected, such as searching just the upcoming weekend, searching the full week, searching only female friends, searching only male friends, searching a geographic area, or alternatively, searching a select group of friends.

Alternative exemplary settings for the application include (1) the weekend, (2) Thursday through Sunday, or (3) the full week.

There may also be advertiser specific settings, e.g. for an alcohol sponsor the application advertisement could be available through Facebook™ only to users over legal drinking age.

The application may also have a landing page (also including space for advertising) that can encapsulate events going on in a particular city over the weekend or the next week.

This application may also have a mobile app that allows you to update your location, or find your friend's location in real time on your phone. It will have a setting for not just friends, but friends of friends, to allow you to broaden the search. As an example, if you are planning a trip to New York, and want to know what friends (including friends of friends are doing depending on the setting) are doing you simply go to this mobile application and it will update locations in real time.

The mobile application allows updating in real time, so that a user and "audible" at any time, giving him or her tools to change plans. The mobile application ties into the "maps" function and allows users to see in real time where friends are located or what is going on that night. This function can be particularly attractive to an advertiser with last-minute tickets available to an event.

It allows a user to update his or her location, or find a friend's location in real time. As an example, if you are planning a trip to New York for the weekend, and want to know what friends (including friends of friends are doing depending on the setting) are doing, you simply go to this mobile application and it will update locations in real time.

In terms of privacy, there are two privacy settings: friends (where only friends can see your upcoming plans); or friends of friends (allows anyone who is a friend of your friend to see your upcoming plans). A third setting eventually will be a "tastemaker" setting where tastemakers in your city can add events to your "7 Days Out" application, if you chose to allow this function.

Items in a user's personal calendar can be tagged (on Microsoft Outlook for example) and uploaded to "7 Days Out". However, only tagged items will be uploaded to "7 Days Out" and private (uritagged) events, such as a doctor's appointment, will not be uploaded.

In terms of monetizing the application, the interface allows display ads to be published inside the application's canvas page. The application's interface is designed for clean, simple, relevant ads to be included on each 7 Days Out presentation. The application also monetizes by affiliate links. Events will have links to purchase tickets. Users will ultimately be able to sell tickets to events in which case the transaction can occur through "7 Days Out".

The "canvas page" URL is the location on Facebook itself that the users visit to get to the "7 Days Out Application". The URL can be an address on a social networking platform server. It is:
http://apps.facebook.com/7daysout.

Figure 7:
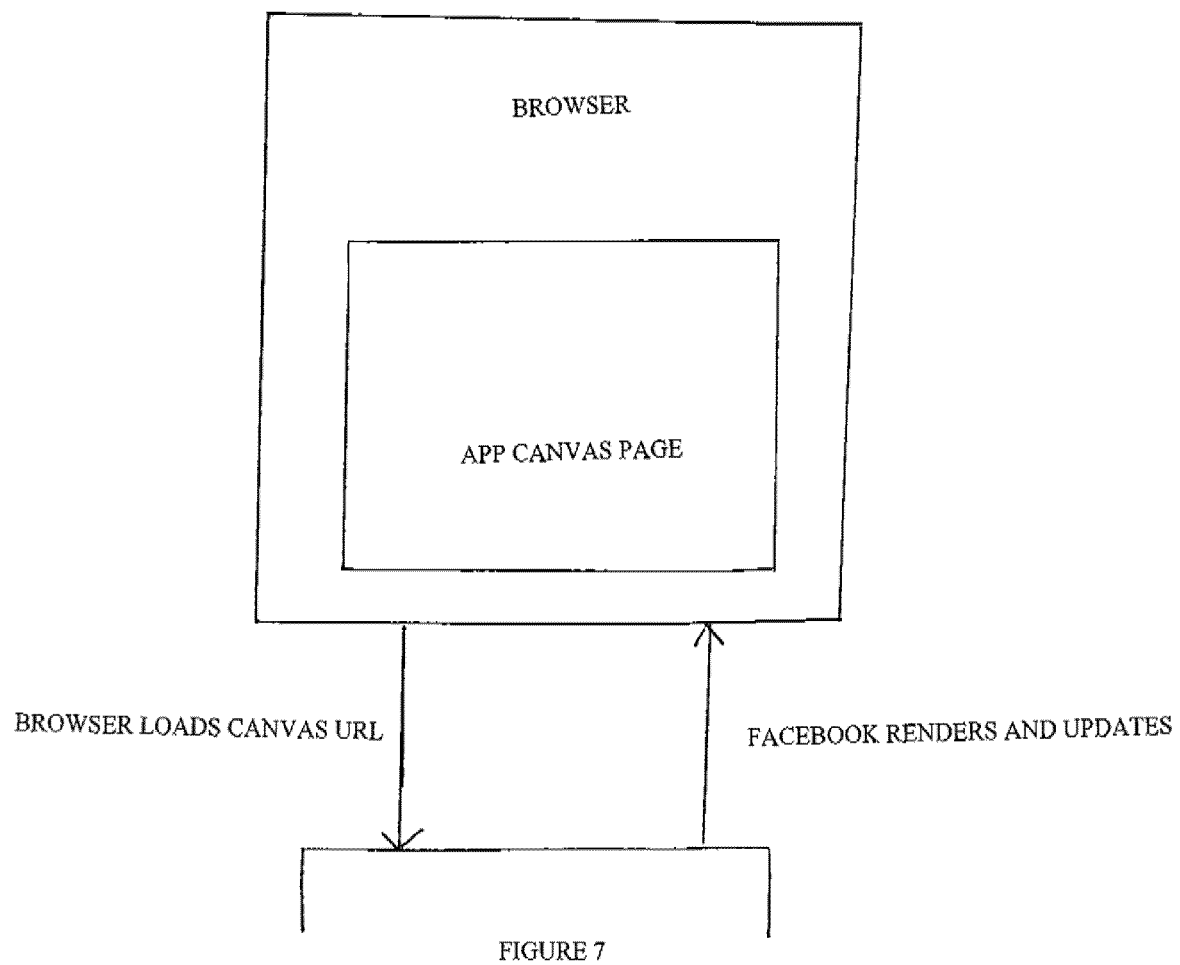
FIG. 7 depicts a workflow diagram showing the interaction of Facebook with the canvas page" for the "7 Days Out" application. "weekend", for the next "7 day week" or for the next month according to an exemplary embodiment of the invention.

The "canvas callback" URL is the location on our server where our application resides. Facebook will call this URL when it needs to display the application page, when a user seeks to see what his or her friends are doing as uploaded on "7 Days Out", when a user seeks to upload events to the "7 Days Out" application, or when it needs to update its cache. The server hosting the "canvas callback" URL can handle the callbacks using whatever web server or language the developer deems appropriate. Facebook passes a set of data post variables to the "canvas callback" URL containing information about the viewing user, the session and the application. The server can manually process these or use one of the API wrapper libraries to do it. Note that every time a user goes to the application "canvas page", Facebook calls the application's "canvas callback" URL. This application will be FBML. Facebook will render the content before displaying it, as it does with all FBML. The following is the workflow to show how Facebook interacts with the "canvas page" for "7 Days Out". See FIG. 7.

It should be understood, of course, that the foregoing relates to exemplary embodiments of the invention and that modifications may be made without departing from the spirit and scope of the invention as set forth in the following claims.

I claim:

1. A method comprising the steps of:
providing a plurality of pre-defined options to a plurality of users to fill a plan for each day for a pre-defined number of days;
sharing the filled forms of the plurality of users with a first user, wherein the first user and the plurality of users are connected through a social networking platform, and wherein the location of the plurality of users being updated in the filled forms;
providing an option to a plurality of advertisers to advertise services based on the filled forms of the plurality of users; and
enabling the first user to plan a trip with a first set of users of the plurality of users based on the filled forms by the plurality of users, advertised services by the plurality of advertisers and updations of locations of the plurality of users in the filled forms.

2. The method according to claim 1, further comprising enabling the first user to sort the filled forms by the plurality of users.

3. The method according to claim 1, further comprising enabling the first user to rank the filled forms by the plurality of users.

4. The method according to claim 1, wherein the location of the plurality of users is dynamically updated in the filled forms.

5. The method according to claim 1, wherein the enabling the first user to plan the trip comprises enabling search of filled plan based on geographic area.

6. The method according to claim 1, wherein enabling the first user to plan each day of the pre-defined number of days according to the filled forms of the plurality of users planning for a trip in a geographical area and advertised services in the geographical user.

7. The method according to claim 1, further comprising enabling enabling plurality of advertisers to advertise services based on a location filled in the form by the plurality of users.

8. A non-transitory computer-readable storage medium comprising programmable instructions adapted to be executed on one or more processors, and to perform a method of enabling the first user to plan a trip at a platform server, the platform server being administered by at least one of an administrator, the programmable instructions causing at least one processor to:
provide a plurality of pre-defined options to a plurality of users to fill a plan for each day for a pre-defined number of days;
share the filled forms of the plurality of users with a first user, wherein the first user and the plurality of users are connected through a social networking platform, wherein the location of the plurality of users being updated in the filled forms;
provide an option to a plurality of advertisers to advertise services based on the filled forms of the plurality of users; and
enable the first user to plan a trip with a first set of users of the plurality of users based on the filled forms by the plurality of users, advertised services by the plurality of advertisers and updations of locations of the plurality of users in the filled forms.

9. The computer-readable medium of claim 8, wherein the instructions further comprise the step of causing at least one processor to enable the first user to sort the filled forms by the plurality of users.

10. The computer-readable medium of claim 8, wherein the instructions further comprise the step of causing at least one processor to enable the user to rank the filled forms by the plurality of users.

11. The computer-readable medium of claim 8, wherein the instructions further comprise the step of causing at least one processor to enable search of filled plan based on geographic area.

12. The computer-readable medium of claim 8, wherein the instructions further comprise the step of causing at least one processor to enable the first user to plan each day of the pre-defined number of days according to the filled forms of the plurality of users planning for a trip in a geographical area and advertised services in the geographical user.

* * * * *